Oct. 7, 1969 C. H. FLUBACKER 3,470,777

MARKING AND INDEXING MECHANISM
FOR MAGNETIC RECORDER

Filed Feb. 18, 1965 2 Sheets-Sheet 1

INVENTOR.
CHARLES H. FLUBACKER

BY Hill, Sherman, Meroni, Gross & Simpson ATTORNEYS

Oct. 7, 1969 C. H. FLUBACKER 3,470,777

MARKING AND INDEXING MECHANISM
FOR MAGNETIC RECORDER

Filed Feb. 18, 1965 2 Sheets-Sheet 2

INVENTOR.
CHARLES H. FLUBACKER

BY Hill, Sherman, Meroni, Gross & Simpson ATTORNEYS

United States Patent Office 3,470,777
Patented Oct. 7, 1969

3,470,777
MARKING AND INDEXING MECHANISM FOR MAGNETIC RECORDER

Charles H. Flubacker, Barrington, Ill., assignor to Scribe Internationale, Inc., Chicago, Ill., a corporation of Illinois Filed Feb. 18, 1965, Ser. No. 433,552
Int. Cl. B26d 7/06; B26f 1/00
U.S. Cl. 83—175 6 Claims

ABSTRACT OF THE DISCLOSURE

Magnetic recording assembly including a marking device embodying an endless belt trained about a pair of spindles, and a remotely operable perforating mechanism for perforating the belt to thereby mark that portion of the belt.

The present invention relates to an improved marking and indexing mechanism for a magnetic tape recorder-reproducer assembly.

Magnetic recorder-reproducer devices, particularly of the type used for dictation, require some sort of indexing mechanism to enable the operator to find specific portions of the tape for playback purposes. Such dictation machines frequently provide a paper disk or the like graduated in minutes, enabling the operator to mark specific items with reference to their relative position on the tape, as for example, the end of individual letters or other pieces of dictation. The dictator must then interrupt his dictation, and mark the indexing card with a pencil or the like.

The present invention provides an improved marking and indexing system for such magnetic tape recorders-reproducers. The assembly of the present invention provides an indexing means which can be operated remotely, as from a button location on the microphone, to mark a suitable indexing record. Furthermore, the record itself is graduated along a linear scale, making it much easier to read than some types of indexing records presently available with dictating equipment, which of necessity must employ a non-linear scale for indexing purposes.

One of the objects of the present invention is to provide an improved marking device for use in conjunction with magnetic type recorder-reproducer assemblies, and the like.

Another object of the present invention is to provide an improved marking device for use with magnetic tape recorders employing an endless belt of paper or the like as the marking media.

Another object of the invention is to provide a novel marking device for tape recorders and the like which can be operated from a remote position, without the necessity of interrupting the dictation.

A still further object of the invention is to provide an improved marking device employing an endless belt type indexing medium, in combination with an improved tensioning device for the same.

A further description of the present invention will be made in conjunction with the attached sheets of drawings which illustrate a preferred embodiment.

Figure 1:
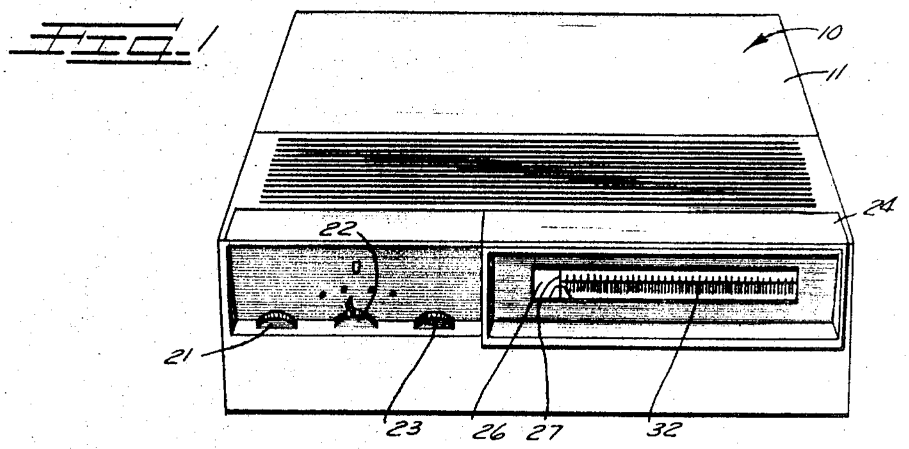
FIGURE 1 is a view in perspective of an improved magazine type tape recorder-reproducer with which the present invention can be employed.

In FIGURE 1, reference numeral 10 indicates generally a magazine type recorder-reproducer with which the system of the present invention can be employed, but it should be recognized that any type of magnetic recorder-reproducer assembly can incorporated the improved marking device of the present invention. Specifically, the type of recorder-reproducer shown in FIGURE 1 embodies a removable magazine 11 in which there is mounted a pair of reels 12 between which the magnetic tape 13 is arranged to travel in either the forward or recording condition or in the reverse or rewind condition. In its travel between the spaced reels located in the magazine 11, the tape 13 is trained about a rubber covered idler roller 14 and a guide roller 16 before passing between a pair of posts 17 and 18 which are part of a retracting assembly generally indicated at numeral 19, the function of the retracting assembly 19 being to engage and disengage the tape 13 with the magnetic transducer head (not shown) depending upon whether the device is arranged for recording, reproducing, rewinding, and the like. The particular tape transport system, of course, forms no part of the present invention and the showing employed in the drawings is purely for purposes of illustration.

Returning to FIGURE 1, the face of the recorder-reproducer 10 is provided with a control knob 21 which provides the main on-off switch and tone control, a selector switch 22 which sets the drive mechanism for various conditions of operation such as normal running, fast forward, rewind, and the like, and a volume control 23.

The front panel of the machine also includes a removable panel 24 carrying a sight glass 26 on which there is inscribed a mark 27. Behind the sight glass 26, an endless belt 28 composed of paper or the like is supported for movement between a pair of spindles, consisting of a driven spindle 29 and a non-driven spindle 31. The endless belt 28 is graduated by means of a linear scale 32 into minutes or other suitable units, the origin of the scale coinciding with the line 27 on the sight glass 26 when the tape 13 begins its travel from the supply reel to the take-up reel within the magazine 11.

The movement of the endless belt indexing medium 28 is dependent solely upon the progress of the tape 13 through the machine. A rubber covered idler roller 33 is provided bearing against the idler roller 14, with the tape 13 confined therebetween. The idler roller 33 is mounted on a shaft 34 which carries a worm 35 arranged to drive a gear 36. The idler roller 33 engages the idler roller 14 through a suitable aperture provided in a partition plate 37 which divides the magazine portion of the unit from the drive mechanism for the recorder.

Figures 3, 4:
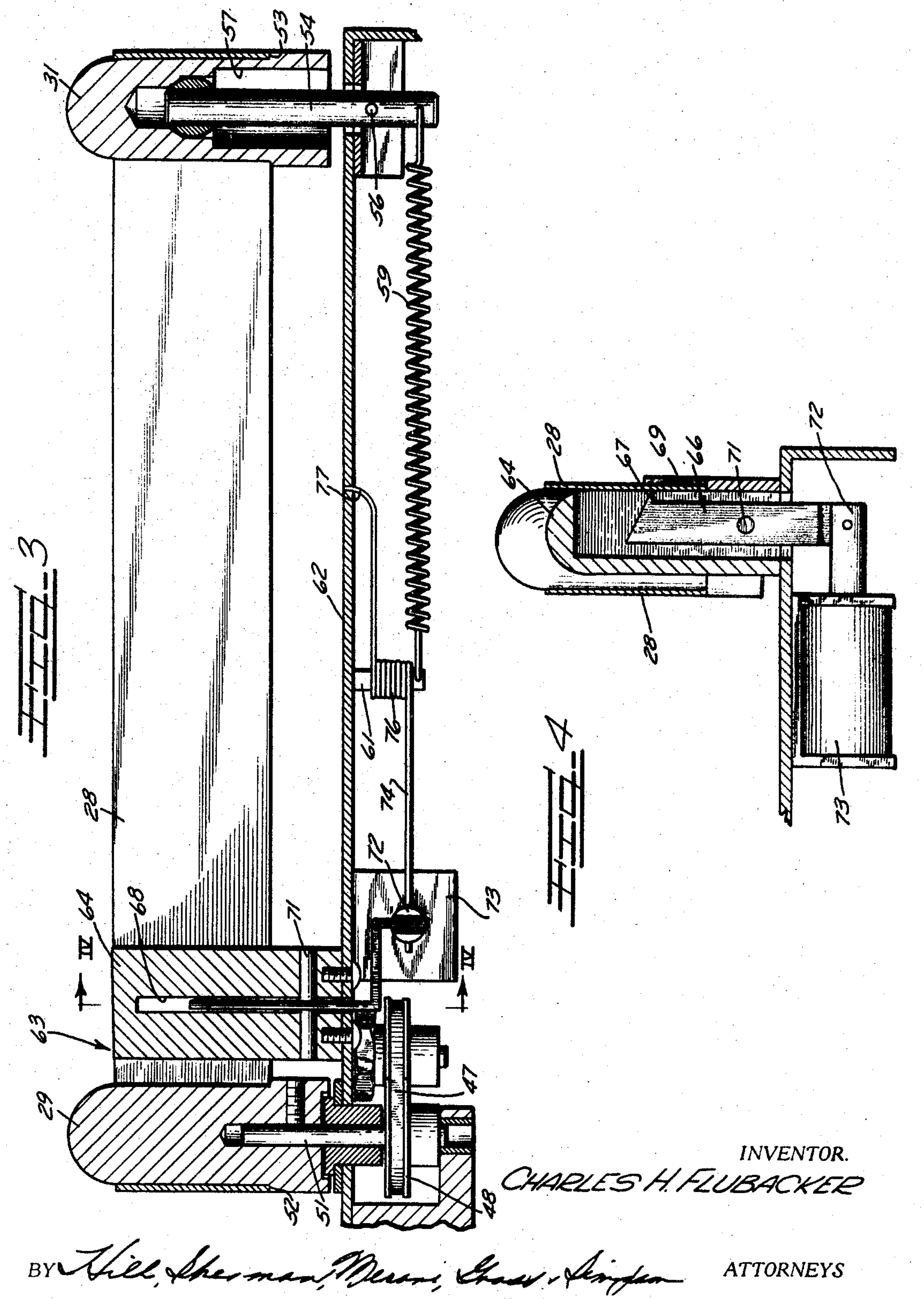
FIGURE 3 is a cross-sectional view taken substantially along the line III—III of FIGURE 2.
FIGURE 4 is a cross-sectional view taken substantially along the line IV—IV of FIGURE 3.

The gear 36 is secured to a shaft 39 and has a worm 41 secured at the opposite end thereof. The shaft 39 is held in position be passing through a suitably apertured bracket 42 extending from the chassis. The worm 41 is arranged to drive a gear 43 secured to a shaft 44. The shaft 44 also carries a pulley 46 about which there is trained a belt 7. The belt 47 is also received about a pulley 48 secured to a shaft 51 as best seen in FIGURE 3 of the drawings. The driven spindle 29 is rigidly connected to the shaft 51 and is driven thereby. The spindle 29 has a shoulder 52 formed therein which provides a stop for the endless belt 28 trained therearound. Similarly, the non-driven spindle 31 has a shoulder 53 thereon to seat the bottom edge of the endless belt 28.

As best seen in FIGURE 3, the non-driven spindle 31 is rockably mounted on a shaft 54 which is mounted for pivotal movement on a pin 56. The spindle 31 is suitably bored so as to provide a recess 57 therein accommodating tilting movement. A bushing 58 extends between the post 54 and the hollow interior of the spindle 31. At the lower end of the post 54, there is provided a spring 59 having one end secured to the post 54, and its opposite end secured to a bracket 61 depending from the chassis 62. The tension of the spring 59 is sufficient to pivot the post 54 in a clockwise direction as viewed in FIGURE 3, and placing the belt 28 about the spindles 29 and 31 restores the spindle 31 to the vertical position shown in FIGURE 3, and thereby applies a tensioning force on the endless belt 28 which keeps the belt taut in its travel about the spindles 29 and 31.

Figure 2:
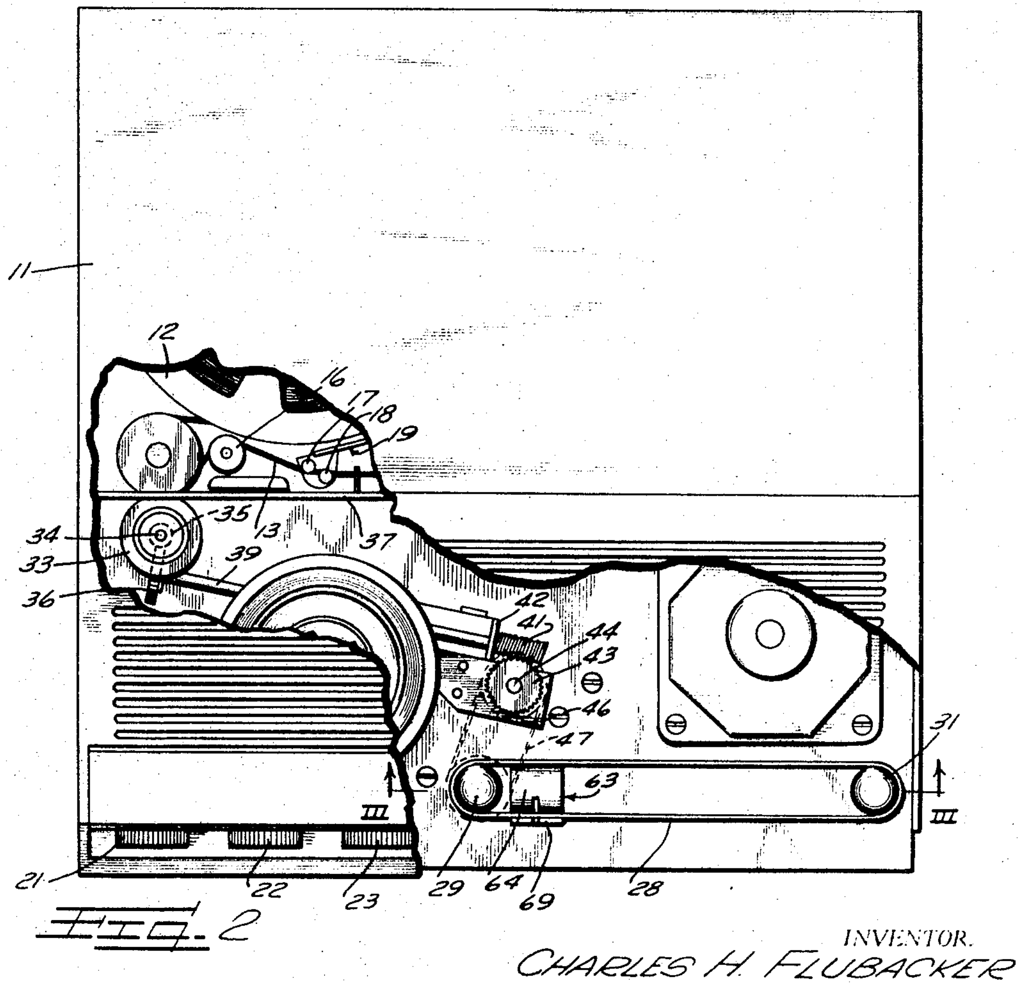
FIGURE 2 is a top plan view of the magnetic recorder-reproducer assembly, with portions broken away to illustrate the drive mechanism more clearly.

One of the other features of the present invention resides in the provision of a perforating mechanism which has been illustrated generally at reference numeral 63 in the drawings. The perforating mechanism 63 consists of a housing 64 in which there is provided a perforator 66 having a perforating edge 67. The perforator 66 is arranged to travel through a slot 68 provided in a housing 64 in an area immediately adjacent the endless belt 28. In the retracted position of the perforator 66, a belt 28 passes between the housing 64 and a guide 69 (FIGURE 2) immediately in front of the housing 64. As best seen in FIGURE 4, the perforator 66 is pivotally mounted on a pin 71, and has an offset end portion pivotally connected to an armature 72 of a solenoid 73 mounted below the chassis 62. The perforator 66 is normally held in the retracted position by the bias provided by a spring arm 74 having a coiled portion 76 about the bracket 61 and having an end portion 77 secured to a suitable portion of the chassis 62.

The actuation of the solenoid 73 is preferably carried out at a remote location, such as by providing a switch directly on the handle of the microphone (not shown). Thus, when the dictator wishes to mark a particular portion for future reference, he merely closes the switch which actuates the solenoid 73, thereby pivoting the perforator 66 about the pin 71, causing the knife edge 67 to punch through the endless belt 28, thereby leaving a permanent mark for purposes of record.

From the foregoing, it will be understood that the marking device of the present invention provides a convenient means for identifying specific portions appearing on the magnetic tape in a convenient and rapid manner.

I claim as my invention:

1. In a magnetic recording assembly, a marking device comprising a pair of spaced spindles, means for driving one of said spindles, an endless belt trained about said spindles, means for biasing the non-driven spindle against said belt to tension the same, a perforating mechanism positioned adjacent the path of movement of said belt, and electromagnetic means connected to said perforating mechanism to operate the same and thereby perforate said belt at a desired position thereon.

2. In a magnetic recording assembly, a marking device comprising a pair of spaced spindles, means for driving one of said spindles, an endless belt trained about said spindles, a pivotally mounted post supporting the non-driven spindle, spring means connected to said post to urge the spindle carried thereon into tensioning engagement with said belt, a perforating mechanism positioned adjacent the path of movement of said belt, and electromagnetic means connected to said perforating mechanism to operate the same and thereby perforate said belt at a desired position thereon.

3. In a magnetic recording assembly, a marking device comprising a pair of spaced spindles, means for driving one of said spindles, an endless belt trained about said spindles, a pivotal perforating means positioned adjacent the path of travel of said belt between said spindles, spring means biasing said perforating means away from said belt, and a solenoid connected to said perforating means to perforate said belt upon energization of said solenoid.

4. In a magnetic recording assembly, a marking device comprising a pair of spaced spindles, means for driving one of said spindles, an endless belt trained about said spindles, a pivotal perforating means positioned adjacent the path of travel of said belt between said spindles, spring means biasing said perforating means away from said belt, means pivotally mounting the non-driven spindle into tensioning engagement with said belt, and a solenoid connected to said perforating means to perforate said belt upon energization of said solenoid.

5. In a magnetic recording assembly, a marking device comprising a pair of spaced spindles, means for driving one of said spindes, an endless belt trained about said spindles, a pivotally mounted post supporting the non-driven, first spring means acting on said post to pivot the same so that said non-driven spindle tensions said belt, a pivotally mounted perforating means positioned adjacent the path of travel of said belt between said spindles, a second spring means urging said perforating means out of engagement with said belt, and a solenoid actuating said perforating means to pivot the same and thereby perforate said belt in its travel about said spindle.

6. The device of claim 5 in which said pivotally mounted post tiltably supports said non-driven spindle.

References Cited

UNITED STATES PATENTS

| | | | |
|---|---|---|---|
| 489,435 | 1/1893 | Hotchkiss | 83—575 X |
| 1,878,643 | 9/1932 | Recke | 83—575 X |
| 2,800,539 | 7/1957 | Edminster et al. | 234—20X |
| 3,286,563 | 11/1966 | Gilbert et al. | 83—175 X |

FOREIGN PATENTS

| | | |
|---|---|---|
| 448,005 | 9/1927 | Germany. |

JAMES M. MEISTER, Primary Examiner

U.S. Cl. X.R.

83—401, 575, 902, 925; 179—100.2; 274—4

PO-1050
(5/69)

UNITED STATES PATENT OFFICE
CERTIFICATE OF CORRECTION

Patent No. 3,470,777 Dated October 7, 1969

Inventor(s) Charles H. Flubacker

It is certified that error appears in the above-identified patent and that said Letters Patent are hereby corrected as shown below:

Page 1, column 1, lines 3 and 4, change the name of the assignee "Scribe Internationale, Inc." to --Artag Plastics Corporation--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents